UNITED STATES PATENT OFFICE.

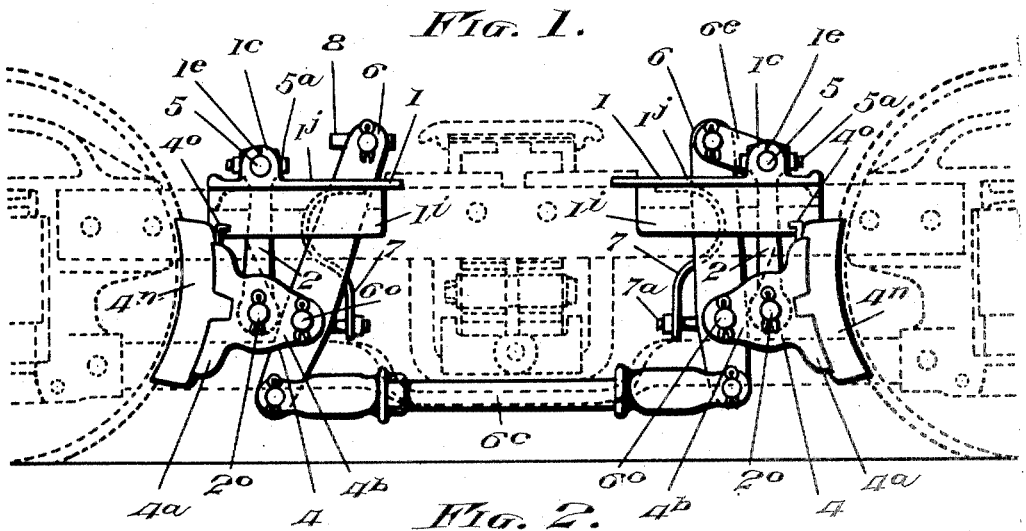
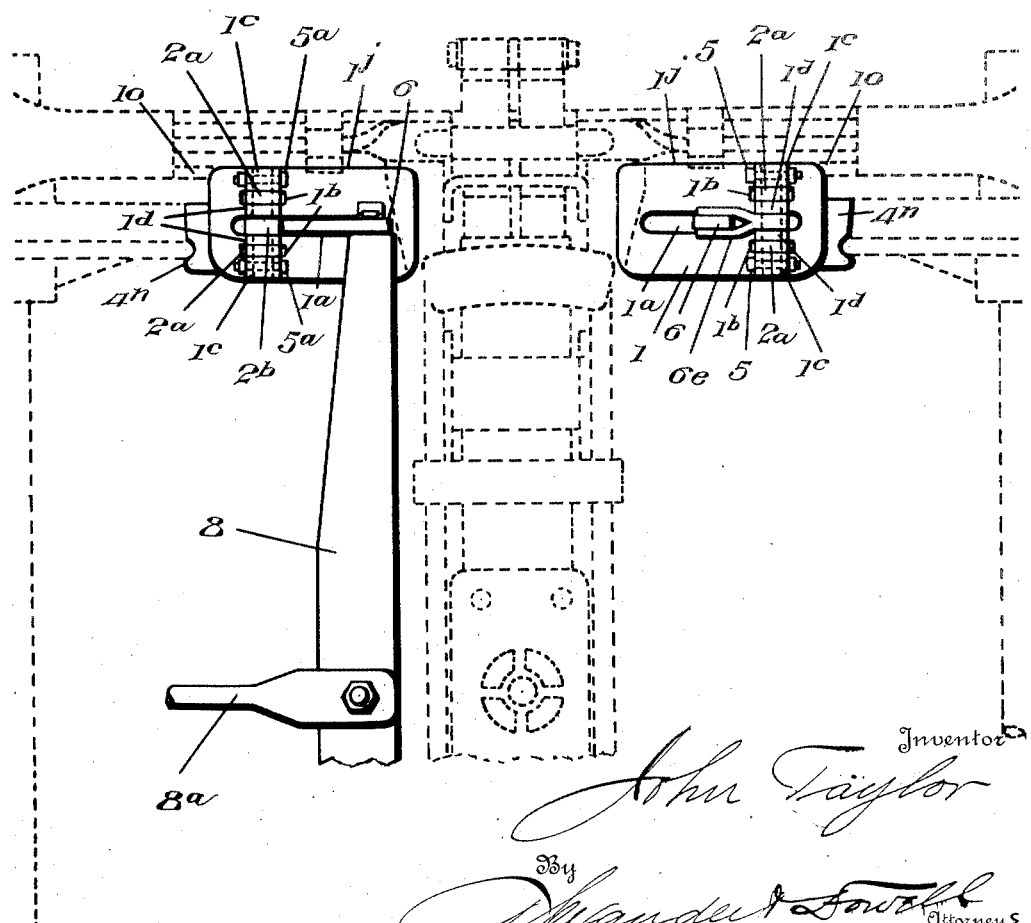

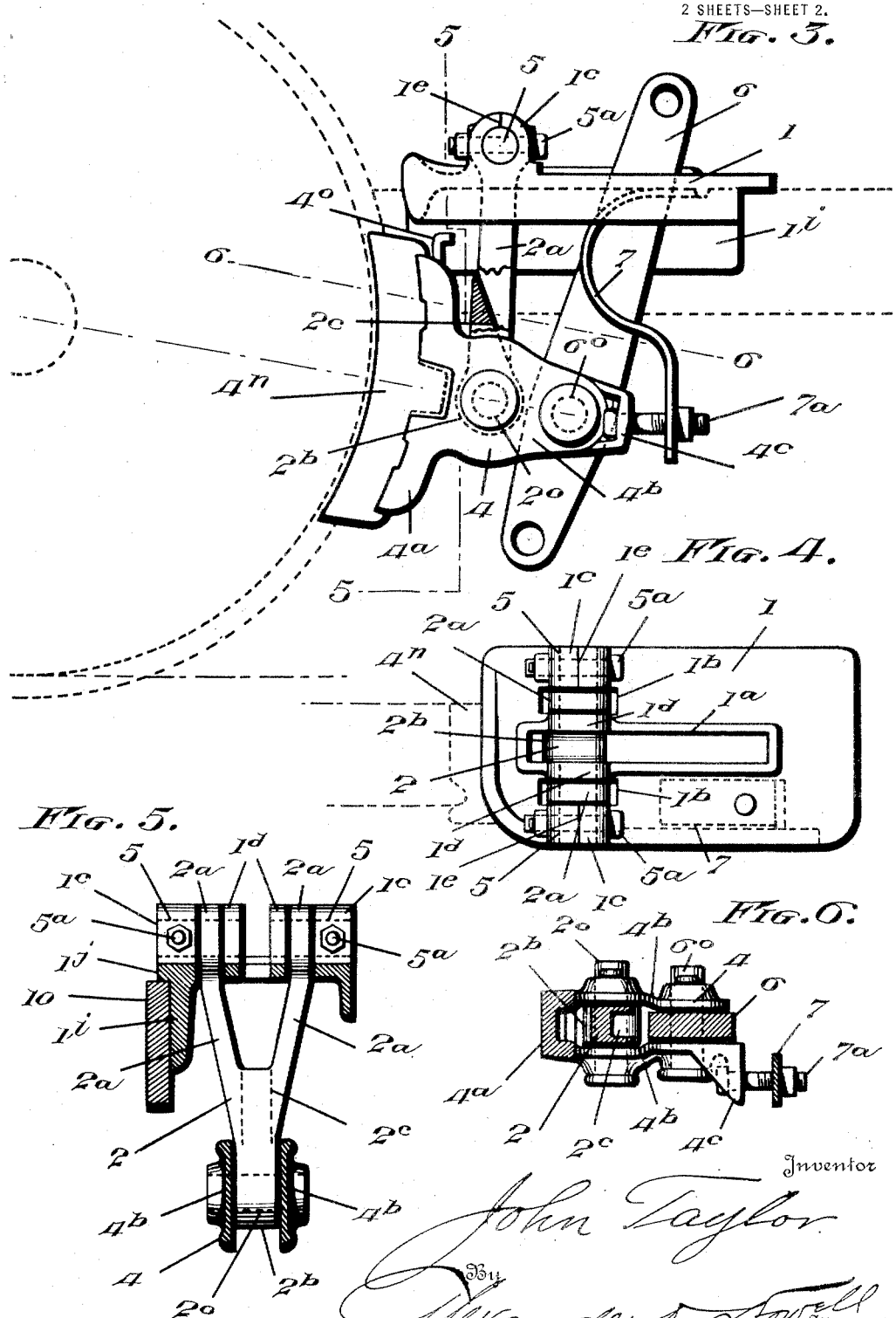

JOHN TAYLOR, OF ALBANY, NEW YORK, ASSIGNOR TO TAYLOR ELECTRIC TRUCK CO., OF TROY, NEW YORK, A CORPORATION OF NEW YORK.

CAR BRAKE.

1,415,730.        Specification of Letters Patent.        Patented May 9, 1922.

Application filed November 15, 1920. Serial No. 424,205.

*To all whom it may concern:*

Be it known that I, JOHN TAYLOR, a citizen of the United States, residing at Albany, in the county of Albany and State of New York, have invented certain new and useful Improvements in Car Brakes; and I hereby declare that the following is a full, clear, and exact description thereof, reference being had to the accompanying drawings, which form part of this specification.

This invention is a novel improvement in inside hung brake mechanisms for electric railway trucks and its objects are (1) to provide a simple, efficient and powerful inside hung brake mechanism, in which the brake heads are located between the truck bolster and the axles; (2) to dispense with the necessity for using transverse brake supporting beams extending across the truck; (3) to provide novel means for supporting each brake shoe in exact alinement with the tread of the related wheel; (4) to sustain the brake shoe in such manner that it can be set very close to the tread of the related wheel without contacting therewith, thereby enabling quick application of the brakes and shortening the travel of the air brake piston. Further objects are to reduce the noise, wear and jar which have been incident to inside brake mechanisms as heretofore constructed; to reduce the cost of repair in adjusting and maintaining the brakes, and to increase the life of the brake mechanism by making it more durable.

I will explain the invention as especially adapted and applied to electric railway car brakes, but it is applicable to various other styles or makes of trucks, both for steam and electric railways, and also to other vehicles to which such brake mechanism may be adaptable; as will be apparent to those skilled in the art when the invention is understood by them.

Electric railway companies now require trucks having long wheel bases to receive inside hung motors, (i. e., motors hung between the truck bolster and axles), and inside hung brakes, (i. e., brakes located between the truck bolster and axles), which are necessary in order to make the trucks ride easily and steadily. In order to maintain the brake heads and shoes of inside hung brakes in alignment with the treads and flanges of the wheels, it has heretofore been necessary to use heavy and strong brake beams extending across the truck from brake head to brake head, and as inside hung motors project back toward the center of the truck it has become necessary to offset or bend such brake beams toward the center of truck in order to clear the motor; such bending increases the weight and leverage of the brake beams and causes the brake heads and shoes to become overbalanced so that the lower ends of the brake shoes soon begin to continually drag against the wheels, resulting in continual wear on the wheels and also on the lower ends of the brake shoes. Such dragging of the brake shoes on the wheels causes disagreeable harsh screeching noises and rattling of the brakes, and also retards the speed of the car and wastes power.

In my invention I dispense with the aforesaid transverse brake supporting beams which have been commonly used heretofore, and instead sustain each brake shoe in line with the tread of the wheel with which it is to cooperate by means of a set of brake supporting and operating devices comprising a novel gusset bracket, a novel brake hanger, a novel brake head and an adjustable brake release spring; and a description of one set of these devices will explain all, similar parts in different sets of devices being similarly lettered.

I will explain one practical embodiment of the invention, as illustrated in the accompanying drawings, applied to electric railway trucks such as shown in my Patent #1,274,348; dated July 30, 1918; and set forth in the claims the essentials of the invention, and the novel features of construction and novel combinations of parts therein for all of which protection is desired.

In said drawings;

Figure 1 is a side elevation of my brake mechanism, applied to a truck, indicated in dotted lines.

Figure 2 is a top plan view of Figure 1 showing one half of the brake mechanism.

Figure 3 is an enlarged side elevation of one set of brake shoe supporting and operating devices.

Figure 4 is an enlarged top plan view of the gusset bracket.

Figure 5 is a detail section on the line 5—5 Figure 3.

Figure 6 is a detail section on the line 6—6 Figure 3.

The gusset bracket.

The gusset bracket is somewhat similar in shape and design to the gusset bracket shown in my aforesaid Patent #1,274,348, see Figures 3 and 5. This gusset bracket has a substantially flat top portion provided with a depending flange $1^i$ which is securely fastened to the inner side bar 10 of the main frame of the truck adjacent the inner side of the tread of the related wheel, so that the gusset bracket extends inwardly in line with and opposite the tread of the related wheel, as shown in Figures 1 and 2; and the bracket is preferably provided with a lip $1^j$ on its outer side adapted to rest upon the top end of the bar 10 (Fig. 5) and thus assist in supporting the weight of the bracket on said bar.

As shown this gusset bracket has a longitudinal central slot $1^a$ for the accommodation of the brake lever 6 and two parallel slots $1^b$ adjacent the outer end of slot $1^a$ and on opposite sides thereof to receive the upper ends of a Y-shaped brake hanger 2. At the outer side of each short slot $1^b$ is a pillar block or eye $1^c$ which is formed on or rigidly attached to the gusset bracket. These pillar blocks are bored out to receive large diameter pins 5 that extend in and through the pillar block, through the upper ends of the Y-shaped hanger 2 and through supporting lug $1^d$ formed on or attached to the gusset bracket between the short slots and the center slot; the inner end of the pins 5 (when two are used) being flush with the adjacent sides of the slot $1^a$ to allow free action of the brake lever 6.

The top of each pillar block $1^c$ is slit lengthwise of the pin, as by sawing a slot $1^e$ therein, and each pillar block $1^c$ and pin 5 is preferably transfixed by a horizontal bolt $5^a$ which is screwed up tight to close the slot and clamp the pin 5 to prevent it from turning or rattling, while allowing the Y-shaped brake hanger 2 to swing freely on the pins 5.

The supporting lugs $1^d$ further prevent pins 5 from bending or working up and down under the tremendous strains exerted thereon by the hangers when the brakes are applied to stop an electric railway car. The lugs $1^d$ are preferably bored out slightly smaller than the pillar blocks, to receive and closely fit and support the inner ends of the straight pins 5.

The brake hanger.

The brake hanger 2 may be of any suitable construction but is preferably Y-shaped having a bifurcated upper end and a lower shank. The upper ends of the bifurcations $2^a$ of the hanger are formed to enter the slots $1^b$ and are perforated for engagement with the pins 5 on which the hanger swings. The lower end $2^b$ of the hanger is formed with an opening for the passage of a large diameter pin $2^c$ and with wide chafing surfaces at each end of said opening engaging the inner sides of the jaws or cheeks $4^b$ of the brake head 4. (See Fig. 6.)

In the shank of the Y-shaped brake hanger, on the side opposite the tread of the wheel, is a beveled recess $2^c$ (Fig. 3) to allow the live brake lever 6 to swing fully outward in the slot $1^a$ of the gusset bracket 1 when the brakes are applied.

The brake heads.

Each brake head 4 (see Figures 1, 3 and 6) is preferably provided with a front portion $4^a$ and parallel projecting arms or cheeks $4^b$. The brake shoe $4^n$ is secured to the front portion $4^a$ of the brake head by a curved key $4^o$ in the usual manner. The lower end of the brake hanger 2 is loosely but closely embraced between the cheeks $4^b$ and secured thereto by the large diameter pin $2^c$ (see Figures 3, 5 and 6). The brake lever 6 extends between the cheeks $4^b$ to the inside of the pin $2^c$ and is pivotally connected to the cheeks $4^b$ by a pin $6^o$. The space between the cheeks $4^b$ is slightly widened at the point where the lower end of the Y-shaped brake hanger 2 is fitted to the pin $2^c$, and the cheeks extend well up on each side of the brake hanger to prevent any side action or rattling thereof while allowing the brake head to swing easily forward or backward with the brake hanger 2.

At the point where the brake lever 6 is pivoted to the cheeks the space between the cheeks $4^b$ preferably is narrowed (see Fig. 6) sufficiently to make a loose but easy fit against the sides of the brake lever. By this construction the brake head cannot work or twist sidewise and thus the brake shoe is kept in absolute and direct alignment with both the tread and flange of the related wheel. The brake heads are so constructed that they can be used on either side of the truck by turning the head up side down, thus obviating making right and left heads.

The brake release spring.

The adjustable brake release spring 7 is preferably curved as shown, and its upper end is secured or bolted to the underside of the gusset bracket. The lower end of this spring is adjustably engaged with a bolt $7^a$ the head of which is engaged with a bracket 4ᶜ on one of the cheeks 4ᵇ of the brake head (see Figures 3 and 6). The tension of the spring 7 may be regulated by a nut on the bolt 7ᵃ. This brake release spring will release or pull back the brake head and disengage the brake shoe from the periphery of the wheel.

There will be one set of these brake devices, to wit; gusset bracket, brake head, brake hanger, and brake release spring, mounted on the truck adjacent each wheel. The top of the forward live brake levers 6 may be connected to a transverse brake bar 8 connected by rod 8ᵃ in the usual manner to the desired brake actuating devices (not shown); such as the piston of an air brake cylinder. The lower ends of the live and dead brake levers 6 at the same side of the truck are connected by adjustable rods 6ᶜ in the usual manner. The upper ends of each dead brake lever 6 may be connected by a shackle 6ᵉ to the pin 5 on the related gusset bracket, as indicated in Figures 1 and 2. By moving the bar 8 to oscillate the live lever 6 the dead levers 6 would be simultaneously properly operated to apply all the brake shoes simultaneously to the wheels.

I do not consider the present invention limited to any particular arrangement for operating the brake levers 6 nor to any particular connections between the brake levers 6, as they can be connected and operated in the manner best suited to the truck or vehicle on which the brake mechanism is mounted.

The pin 2ᵒ transfixes the brake head as shown in Figures 3, 4 and 5 and allows the brake head to swing on the hanger and adjust itself to the periphery of the wheel. The brake head thus swings or pivots at two points (5 and 2ᵒ). This is very advantageous on account of the truck frame being yieldingly suspended as usual on springs that support the truck on the axles, and which springs compensate and neutralize the up and down and oscillating motions of the truck frame when operating over irregularities in the roadbed, such as rough track, bad joints, switches, crossings, etc.

The Y-shaped brake hangers secured by large diameter pins 5 to the related gusset brackets, and having their lower ends 2ᵇ engaged in the related brake head as described, cannot move or swing sidewise of the truck, and obviate the use of the usual offset brake beam; and such brake hangers securely hold the brake heads 4 and shoes 4ⁿ in direct alignment with the tread and flanges of the wheels, and will not allow the brake shoes to wear uneven or work off the wheel treads; also such brake hangers prevent binding or continual friction of the flange portion of the brake shoes against the flanges of the wheels when the brakes are released, thus continually saving power when the car is in operation. This is an important practical feature and obviates many faults of and defects in the present known brake mechanism. With my construction the brake heads and shoes can only swing in straight direct lines toward the centers of the wheels when the brakes are applied, and vice versa when the brakes are released, thus doing away with all noise or rattle.

The brake release spring can be adjusted so that when the brakes are released, the space between the periphery of each wheel and its related brake shoe is even; thus the shoes can be held off of but very close to the peripheries of the wheels and not drag or rattle. This is very essential and necessary in order to enable quick applications of the brake to be made with very little travel of the air brake piston, which is necessary in order to make quick emergency stops, and to economize air.

It will be seen that the brake levers 6 are practically straight bars. In the ordinary forms of inside brake mechanism it has been necessary to place the brake levers on an incline, or to offset them (i. e., bend them in the form of a bayonet), with the result that when they apply the brakes there is a decided twisting strain therein, which tends to force the brake shoes to the outside of the wheels and causes very severe wear therein, and also tends to strain the brake mechanism out of position, but in my invention the brake levers are not twisted or strained sidewise and the pressure is applied in a direct line from the brake levers to the brake shoes.

The pin 20 connecting the brake head next to the wheel, and the pin 6ᵒ connecting the brake lever to the brake head are both located on a straight line radiating from the center of journal of the related truck wheel as indicated in Fig. 3, and the Y-shaped brake hanger and brake lever are so hung in line with the tread and flange of the wheel that the brake is accurately balanced, (i. e., the weight of the brake shoe balances the brake lever) consequently when the brakes are applied, there is a direct straight line application both horizontally and vertically of the brake shoes, and the brakes can be adjusted to operate with very little space between the shoe and the wheels, and with little movement of the brake levers and yet without liability of the brake shoe dragging or rattling, or working off the wheels sidewise; the brake shoes hung by these novel devices will wear down evenly, and are prevented from unevenly wearing off at their lower ends as the shoes on electric railway car brakes heretofore made have a tendency to do, thus greatly enhancing the life of the brake shoes.

I use preferably $1\tfrac{5}{16}''$ diameter brake pins; whereas heretofore the usual diameter of brake pins has been ¾" or 1", and the common practice has been to use case-hardened steel tube bushings in the holes of the brake levers and heads, and case-hardened pins, (which is a very expensive practice) in order to try to eliminate the wear; but these bushings and pins frequently fracture on account of their brittleness due to case-hardening; and my large diameter pins are decidedly safer in service, and will wear practically indefinitely.

My novel straight line action brake mechanism applied to electric railway cars will enable them to make very quick and positive emergency stops without danger; will greatly reduce the cost of labor as there will be far less time required to adjust and maintain my brake devices in service, as compared with those now in use. The cost of maintenance is further reduced by the use of the large diameter pins, which eliminate a large percentage of wear on the parts.

What I claim is:

1. A beamless brake mechanism comprising a slotted gusset bracket attached to the truck frame to the inside of the truck wheel and in line with the periphery thereof; a bifurcated brake hanger swingably suspended from the said gusset bracket in line with the tread of the wheel; a brake head pivoted on the lower end of said hanger in line with the tread of the wheel; a brake lever pivotally connected with said head in line with the tread of the wheel and projecting through the slot in the bracket and operating between the bifurcations of the hanger; and a brake release spring connected with the bracket in line with the tread of the wheel and adjustably connected with the brake head.

2. In a brake mechanism of the character described; a gusset bracket adapted to be attached to the frame, and having a longitudinal slot for the accommodation of a brake lever and a pair of slots on opposite sides of the said lever slot; and perforated bosses on the said bracket at the outer sides of said slots, with a brake hanger having its upper ends entered in said slots and pins engaging said bosses on hanger ends to support the hanger.

3. A bracket as set forth in claim 2; having the bosses longitudinally slit, and bolts transfixing the split bosses to clamp the same upon the hanger supporting pins.

4. In a brake mechanism of the character described; a gusset bracket adapted to be attached to the truck frame and having a longitudinal slot for the accommodation of a brake lever and a pair of slots on opposite sides of and adjacent one end of the said lever slot, and perforated bosses rising from said bracket at the outer sides of said pair of slots, and perforated ears on said casting in line with said bosses at the inner sides of said slot; the said slots being adapted to accommodate the upper end of a bifurcated brake hanger, and said bosses and ears to receive pins to support the hanger thereon.

5. A bracket as set forth in claim 4; having the bosses longitudinally slit, and bolts transfixing the split bosses to clamp the same upon pins inserted therein.

6. In a brake mechanism of the character specified; a brake head having a front portion for the engagement of a brake shoe and having a pair of laterally extending parallel jaws provided with transverse perforations for the reception of a pivot pin whereby the head may be connected to a hanger; and with a second set of perforations whereby the head may be connected to the brake lever, substantially as described.

7. A brake head as set forth in claim 6, having a bracket on one of its jaws for connection thereof to a brake releasing spring, substantially as described.

8. In a brake mechanism as set forth in claim 2; a Y-shaped brake hanger having its upper ends entered into the pair of slots in the gusset bracket and swingably connected to the gusset bracket by large diameter pins transfixing the said bosses; a brake head swingably connected to the lower end of said hanger; and a brake lever connected to said head.

9. In a brake mechanism as set forth in claim 2; a brake head adapted to carry the brake shoe and pivoted to the lower end of the hanger to suspend the head thereon; and a brake lever having its upper end extended through the slot in the gusset bracket and its lower end pivotally connected to the head to the inside of the pivot of the hanger to the head.

10. In a brake mechanism as set forth in claim 2; a brake head having a front portion adapted to carry the brake shoe and provided with rearwardly extended parallel arms adapted to embrace the lower portion of the hanger, and a pin transfixing said arms and the lower end of the hanger to suspend the head thereon; and a brake lever having its upper end extended through the lever slot in the gusset bracket and its lower end pivotally connected to and between the arms of the head to the inside of the pivot connection of the hanger to the head.

11. In brake mechanism of the character specified a gusset bracket; a hanger having a bifurcated end pivotally connected to said bracket; a brake head pivotally suspended on the lower end of said hanger; and a brake lever pivotally connected to said head, said hanger having a recess to permit the free and full movement of the brake lever.

12. In brake mechanism of the character described; a brake hanger having a bifurcated upper end adapted to engage supporting pins and having its lower end constructed for engagement with a brake head, said hanger having a recess to permit the free and full movement of a related brake lever, substantially as described.

13. Brake mechanism comprising a gusset bracket supported on the frame, a Y-shaped hanger pivotally hung on said bracket; a brake head carried by said hanger; a brake lever connected with said head and a brake release spring for said head arranged inside of and opposite each wheel and in line with the periphery thereof; and means for operating the brake lever.

14. In brake mechanism, a gusset bracket attached to the frame of the truck beside a wheel; a Y-shaped hanger suspended from said bracket; a brake head pivotally connected to the lower end of said hanger and carrying a shoe on its outer end; a brake lever pivotally connected to said brake head and extending through the slot in the bracket; and a brake release spring connected to the bracket and to the head, substantially as described.

15. In brake mechanism of the character specified a gusset bracket adapted to be connected to a truck frame beside a wheel; a hanger having a bifurcated end pivotally connected to said bracket; a brake head pivotally suspended on the lower end of said hanger; and a brake lever pivotally connected to said head; said hanger having a recess to permit the free and full movement of the brake lever.

16. In brake mechanism of the character specified; a slotted gusset bracket adapted to be connected to the truck frame beside the wheel; a bifurcated hanger having its bifurcated end pivotally connected to said bracket; a brake head pivoted on the lower end of said hanger; a brake lever pivotally connected to said head to the inside of the brake hanger and extending through the slot in the bracket arm, and a brake releasing spring connected with the bracket and with the rear end of the head.

17. In brake mechanism of the character specified; a slotted gusset bracket adopted to be attached to the frame of the truck in line with the periphery of the wheel; a bifurcated hanger swingable longitudinally of the bracket and pivotally connected therewith at its bifurcated end; a slotted brake head having its lower end embracing the lower end of the hanger and pivotally connected therewith; a brake lever pivotally connected with the extension of the brake head and extending through the slot in the bracket; and a brake releasing spring having its upper end connected with the bracket and its lower end adjustably connected with the brake head.

18. In brake mechanism; a slotted gusset bracket adapted to be attached to the frame of the truck in line with the periphery of the wheel; a bifurcated hanger swingable longitudinally of the bracket and pivotally connected therewith at its bifurcated end by large diameter pins; a slotted brake head having its lower end embracing the lower end of the hanger and pivotally connected therewith by a large diameter pin; a brake lever pivotally connected with the extension of the brake head to the inner side of the pivot of the brake head to the hanger; a brake releasing spring having its upper end connected with the gusset bracket and its lower end adjustably connected with the brake head; and a brake shoe attached to the outer end of the brake head.

19. In brake mechanism of the character described; a brake hanger having a bifurcated upper end adapted to engage supporting pins and its lower end constructed for engagement with a brake head and having a recess to permit the free and full movement of the brake lever, substantially as described.

20. A brake hanger as set forth in claim 19, provided with a beveled recess for the accommodation of the brake applying lever.

21. In brake mechanism of the character described; a brake hanger having a bifurcated upper end adapted to engage supporting pins, and having an eye in its lower end for engagement with a pin connecting it to a brake head, and having a beveled recess in its front side for the accommodation of the brake applying lever.

22. Brake mechanism comprising a gusset bracket adapted to be attached to a truck frame beside a wheel, a Y-shaped hanger suspended from the bracket; a brake head attached to said hanger; a brake lever connected to said head; and a brake release spring all arranged inside of and opposite each wheel and in line with the periphery thereof; said hanger having a recess to permit the free and full movement of the brake lever; and means for operating the brake lever.

23. In combination, a slotted gusset bracket attached to the truck frame beside a wheel; a Y-shaped brake hanger having its upper ends swingably connected to the gusset bracket by large diameter pins; a brake head having a front portion adapted to carry the brake shoe and provided with rearwardly extended parallel arms adapted to embrace the lower portion of the hanger, a pin transfixing said arms and the lower end of the hanger to suspend the head thereon; and a brake lever having its upper end extended through the slot in the gusset bracket and its lower end pivotally connected to and between the arms of the head to the inside of the pivot of the hanger to the head, substantially as described.

24. In brake mechanism as set forth in claim 23 a curved brake release spring having its upper end fastened to the gusset bracket, and an adjustable connection between the lower end of said spring and the brake head, substantially as described.

25. A brake mechanism including four sets of devices; each set comprising a gusset bracket attached to the frame of the truck to the inside of a wheel; a Y-shaped hanger suspended from said bracket; a brake head pivotally connected to the lower end of said hanger and carrying a shoe on its outer end; a brake lever pivotally connected to said brake head and extending through the slot in the bracket; and a brake release spring connected to the bracket and to the head; with mechanism for simultaneously operating the brake levers to apply the brakes, substantially as described.

In testimony that I claim the foregoing as my own, I affix my signature.

JOHN TAYLOR.